(12) United States Patent
Smith et al.

(10) Patent No.: US 10,480,692 B2
(45) Date of Patent: Nov. 19, 2019

(54) SANITARY FITTING FOR FLUID HANDLING EQUIPMENT

(71) Applicants: Robert A Smith, Kalamazoo, MI (US); Robert Elbich, Nazareth, PA (US)

(72) Inventors: Robert A Smith, Kalamazoo, MI (US); Robert Elbich, Nazareth, PA (US)

(*) Notice: Subject to any disclaimer, the term of this patent is extended or adjusted under 35 U.S.C. 154(b) by 799 days.

(21) Appl. No.: 14/854,485

(22) Filed: Sep. 15, 2015

(65) Prior Publication Data
US 2017/0074429 A1    Mar. 16, 2017

Related U.S. Application Data

(63) Continuation of application No. PCT/US2014/026993, filed on Mar. 14, 2014.
(Continued)

(51) Int. Cl.
*F16L 15/04* (2006.01)
*F16L 19/075* (2006.01)
(Continued)

(52) U.S. Cl.
CPC ............. *F16L 15/04* (2013.01); *F16L 15/08* (2013.01); *F16L 19/075* (2013.01); *F16L 21/08* (2013.01)

(58) Field of Classification Search
CPC ......... F16L 19/07; F16L 19/075; F16L 15/04; F16L 15/08; F16L 21/08; F16L 27/1008;
(Continued)

(56) References Cited

U.S. PATENT DOCUMENTS 3,249,372 A    5/1966  Pollack
3,851,899 A *  12/1974 Franz .................. F16L 17/06
                                              285/355
(Continued)

FOREIGN PATENT DOCUMENTS

DE      4426795 A1 *  2/1996
DE     19909394 A1 *  9/2000
(Continued)

OTHER PUBLICATIONS

The International Search Report and Written Opinion of the International Searching Authority for PCT/US2014/026993, date completed Jul. 7, 2014, dated Jul. 15, 2014.

*Primary Examiner* — Anna M Momper
*Assistant Examiner* — James A Linford
(74) *Attorney, Agent, or Firm* — Miller Canfield Paddock and Stone; Mark L Maki

(57) ABSTRACT

A sanitary fitting for biopharmaceutical equipment includes an elongate tubular insert having a main tubular section, which is cylindrical and terminates at an annular flange or annulus which seats at a bottom of a socket in an equipment housing. The bottom face of the annulus includes a groove, which receives a gasket that is compressed between the annulus and bottom face of the socket to prevent entry of fluids into this space. A threaded section of the socket is spaced outwardly of the smooth surfaced fitting so as to receive a threaded nut within such space. A threaded nut is slid down the fitting and engaged with the socket threads wherein the nut drives the socket into and retains the fitting tightly within the socket.

8 Claims, 4 Drawing Sheets

Related U.S. Application Data

(60) Provisional application No. 61/793,887, filed on Mar. 15, 2013.

(51) Int. Cl.
  *F16L 15/08* (2006.01)
  *F16L 21/08* (2006.01)

(58) Field of Classification Search
  CPC ..... F16L 27/023; F16L 27/08; F16L 27/0804; F16L 27/0808; F16L 27/1017
  USPC ........................................ 285/355, 351, 353
  See application file for complete search history.

(56) References Cited

U.S. PATENT DOCUMENTS

| | | | | |
|---|---|---|---|---|
| 4,621,843 A | * | 11/1986 | Straub | F16L 19/07 285/356 |
| 4,707,000 A | * | 11/1987 | Torgardh | F16L 37/088 285/305 |
| 5,118,141 A | * | 6/1992 | Miyashita | F16J 15/0893 285/23 |
| 8,555,624 B2 | * | 10/2013 | Lechner | F16L 21/08 60/303 |
| 8,567,827 B2 | * | 10/2013 | McGuire | F16L 19/00 285/354 |
| 2006/0237964 A1 | * | 10/2006 | Nielson | F16L 27/0808 285/272 |

FOREIGN PATENT DOCUMENTS

| | | | |
|---|---|---|---|
| DE | 102012004165 A1 | * | 2/2013 |
| FR | 3048050 A1 | * | 8/2017 |
| GB | 170179 | | 10/1921 |
| NL | 7908624 | | 6/1980 |
| WO | WO 01/63161 | | 8/2001 |
| WO | WO-2014152139 A1 | * | 9/2014 |

\* cited by examiner

SANITARY FITTING FOR FLUID HANDLING EQUIPMENT

CROSS REFERENCE TO RELATED APPLICATIONS

This application asserts priority from provisional application 61/793,887, filed on Mar. 15, 2013, and is a continuation of PCT application PCT/US2014/26993, filed on Mar. 14, 2014, which are incorporated herein by reference.

FIELD OF THE INVENTION

The invention relates to a sanitary fitting for connecting piping to fluid handling equipment, particularly used for the bio-pharmaceutical industry.

BACKGROUND OF THE INVENTION

In the bio-pharmaceutical industry, there is a particular need to provide sanitary fittings on bioprocessing (BPE) equipment. More particularly, mechanical seals for such equipment may have fluid lines connected thereto which supply pressurized fluid used in the mechanical seal to help prevent leakage of product and process fluid along a shaft, such as a pump. In this regard, it is important that the fittings for the fluid handling equipment do not allow entry of contaminants into the flow of product and process fluid. Due to the clean environment in which these mechanical seals are used, the fittings are referred to as sanitary fittings. For example, in fluid-pressurized mechanical seals used in the bio-pharmaceutical marketplace, it has become necessary to eliminate standard threaded fittings in seal housings of this type, since threaded fittings can trap contaminants and may be difficult to clean or even be unclean-able.

Therefore, it is known to replace drilled and tapped holes on seal housings with welded sanitary fittings, which are welded to the seal housing and permit the connection of fluid lines to the seal for pressurizing the seal with a seal fluid. However, the welded fittings must meet stringent weld requirements as set forth in established standards such as the ASME BioProcessing Equipment (ASME BPE) Standard.

In one known practice, the sanitary fittings are ferrules welded to a length of tube, wherein the ferrule and a 0.5 inch tube are welded using an orbital welder, and then the surfaces of the weld, internally and externally, are machined to a fine surface finish consistent with the rest of the component. The welded assembly in turn is welded to a seal housing. The interior of the tubing is honed to improve the surface finish around the weld and the weld is inspected internally and externally.

Once welding, honing, and inspection are completed and the piece is found to meet current quality requirements, it is sent to be electropolished and/or passivated, wherein the electropolish must pass inspection of the housing. While the final structure works adequately, the welding of the fittings to the seal housings can prove difficult since the housing must be prepared for welding by machining to precise design standards. The fitting must be prepared for welding by cutting it to the proper length and beveling the tubing to accurately fit to the housing. The tubing must be fit to the housing and held in place while welding takes place. The welding is particularly difficult because of the room available, the fact that no filler may be added, it must be a full penetration weld, and a slight shake of the welder's hand will cause a 'burn' on the housing.

If electropolishing exposes problems with the weld, the housing must be scrapped or re-machined, and if re-welding the piece is required, it must again go through the electropolishing and/or passivation step.

In view of the foregoing, it is an object of the invention to provide an improved sanitary fitting for mechanical seals and other fluid handling equipment, particularly when used in the BPE industry.

The invention relates to a threaded sanitary fitting which eliminates the use of welds while meeting the requirements of established standards including the ASME BPE Standard. The threaded sanitary fitting can be screwed into a socket in the seal or equipment housing and still maintains a cleanable and sanitary joint as required by the ASME BPE standards. Normally, a screwed in fitting is not considered cleanable because of the shape of the gasket groove and the exposure of threads to contaminants, which can be held within the threads. The inventive fitting overcomes such difficulties since a non-threaded tubular insert is fitted into a receiver socket and includes a gasket and fastener construction, which secures the tube insert within the socket by threads but prevents passage of contaminants between the fluid passage and the exterior of the tube insert where the threads are located.

More particularly, the threaded socket is formed in the equipment housings or other structure to which the insert will be connected. The sanitary fitting includes an elongate tubular insert, which has a main tubular section, which is cylindrical and terminates at an annular flange or annulus which seats at the bottom of the socket. The bottom face of the annulus includes a groove, which receives a gasket that is compressed between the annulus and bottom face of the socket to prevent entry of fluids into this space. A threaded wall of the socket is spaced outwardly of the smooth-surfaced insert so as to receive an externally-threaded nut within such space. The nut is slid down the fitting and engaged with the socket threads wherein the nut abuts against a top face of the annulus and drives the fitting insert into and retains the insert tightly therein.

When the nut is screwed in and tightened, the o-ring at the annulus bottom extrudes inwardly toward the interior passage defined by the interior diameter of the tubular insert and the housing bore formed in the seal housing. This compression of the O-ring axially deforms and radially widens the O-ring to minimize any crevice at the joint between the insert and socket, which crevice could otherwise create a pocket that would retain fluid when the rest of the system is drained.

At the top of the nut, a secondary o-ring is provided to seal the threads from atmospheric dirt and debris. Since the hex nut and tubular insert are separate pieces the tubing can be bent to an angle and held in proper position while the nut is tightened.

The advantages of this fitting include: no additional machining preparation on the existing housings; the fitting can be supplied pre-welded and electropolished; o-rings can be installed so that assembly only requires threading in of the nut; no BPE welding is required at a manufacturer; bent or damaged tubes or wrong lengths can be replaced with no damage to housing; a housing can be electropolished once without interference of welded fittings; housings and fittings can be more accurately and quickly inspected; shipping containers can be smaller (if a mechanical seal is shipped without the fittings installed.

Other objects and purposes of the invention, and variations thereof, will be apparent upon reading the following specification and inspecting the accompanying drawings.

Figure 1:
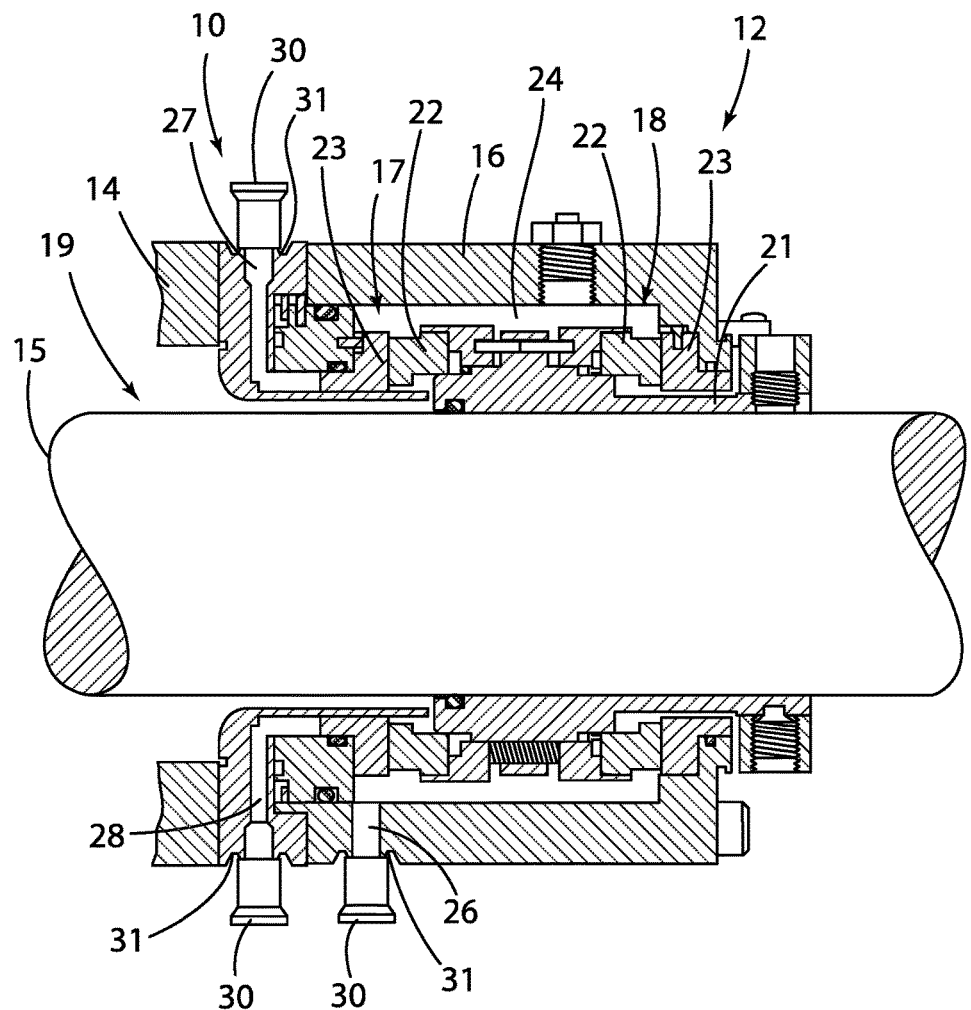
FIG. 1 is a cross sectional view of a representative mechanical seal.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a representative device is shown which is used with a sanitary fitting 10 according to the present invention. This device is preferably a component used in bioprocessing equipment (BPE) which requires the mounting of a sanitary fitting thereto. The preferred component for this equipment is a mechanical seal 12 which mounts to a housing 14 in surrounding relation to a rotating shaft 15. It will be understood that bioprocessing equipment can take different forms and therefore, may not necessarily be limited to a pump, compressor or other fluid handling equipment.

Regardless of the equipment to which the inventive fitting 10 is mounted, it will be understood from the following discussion that other types of BPE equipment and equipment components might be used in association with a sanitary fitting tin. The mechanical seal 12 is shown in a representative form as having a seal housing 16 which mounts to the equipment housing 14 in a conventional manner. It remains stationary during shaft rotation and includes two pairs of seal rings 17 and 18, which cooperate between the stationary seal housing 16 and the shaft 15 so as to prevent leakage of fluid from an equipment chamber 19. In one example, this equipment chamber 19 may be the pumping chamber of a fluid pump.

Generally, as to the seal rings 17 and 18, a shaft sleeve 21 is mounted to the shaft 15 so as to rotate therewith and in turn, this shaft sleeve 21 supports first and second rotary seal ring 22 thereon. Additionally, stationary seal rings 23 are supported on the seal housing 16 so that the stationary seal rings 23, i.e. stators, remain stationary, while the rotary seal rings 22, i.e. rotors, rotate in unison with the shaft 15.

The mechanical seal 12 further includes a seal chamber 24 which is defined radially, outwardly of the seal rings 22 and 23, so as to define a radial space between these seal rings 22 and 23 and the inside surface of the seal housing 16. This seal chamber 24 is provided with an appropriate buffer or barrier gas through an inlet port 26.

Additionally, the equipment housing 14 for the seal housing 16 may also include additional ports 27 and 28 which allow for the passage of fluid therethrough during operation of the BPE equipment. In the illustration of FIG. 1, a known sanitary fitting 30 is mounted to each of the ports 26, 27 and 28 wherein a common design for this sanitary fitting 30 is provided. In each case, the sanitary fitting 30 is welded to the seal housing 16 or even to an equipment housing 14 by suitable peripheral welds 31 as discussed in the background of the invention of the present application. However, welding of such sanitary fittings 30 is undesirable for the various reasons discussed above.

Figure 2:
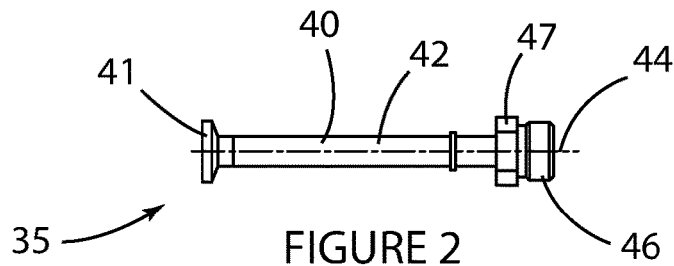
FIG. 2 is a side view of a sanitary fitting of the invention.
Figure 3:
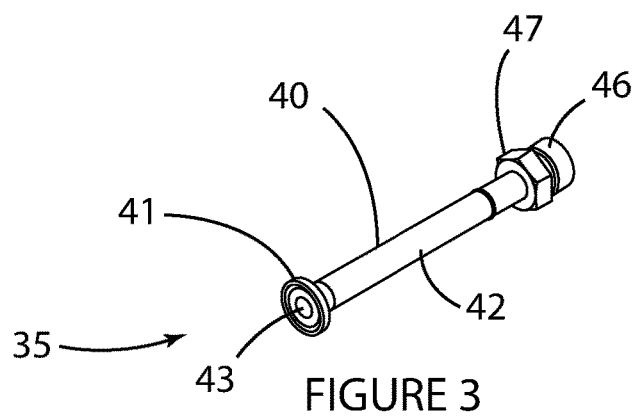
FIG. 3 is an isometric view thereof.
Figure 4:
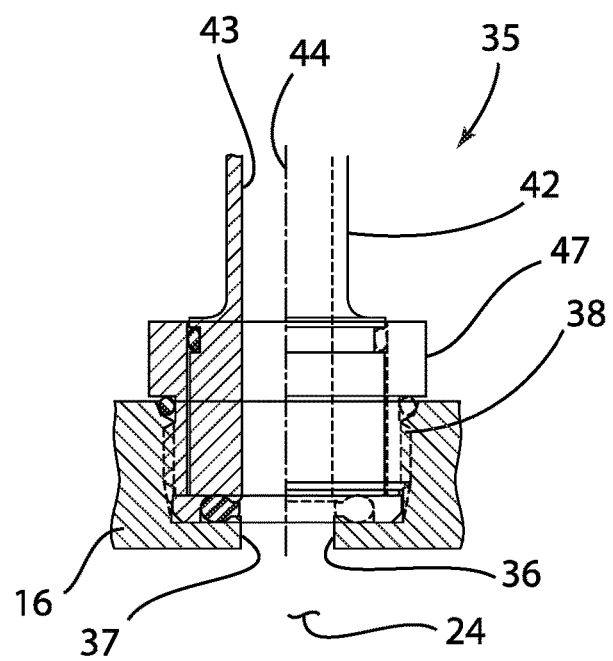
FIG. 4 is a cross-sectional view thereof.

Referring to FIGS. 2-4, the present invention relates to an inventive sanitary fitting 35 which is mountable to an equipment housing 14 or component housing 16 through suitable modifications which will be apparent in the following discussion. Essentially, the inventive sanitary fitting 35 is mountable to any of the exemplary ports 26-28 of FIG. 1 or any other suitable port used in BPE equipment.

Generally, FIG. 4 illustrates a representative component housing 16 which includes an appropriate port 36 which includes a discharge or exit opening 37 that opens into discharges into an equipment chamber such as the seal chamber 24. This exit opening 37 has a defined diameter and a smooth interior surface. The outward side of the port 36 defines a mounting socket 38 which opens outwardly and defines the location at which fluid is supplied to the chamber 24 through the sanitary fitting 35. Generally, this socket 38 is oversized relative to the discharge opening 37 and is internally threaded for engagement with the sanitary fitting 35.

Referring to FIGS. 2-4, the sanitary fitting comprises a tubular insert 40 which has an enlarged annular flange 41 on an outer end thereof which is adapted for engagement with fluid feed lines of other components of the BPE equipment. For example, where the sanitary fitting 35 is mounted to the port 26 in FIG. 1, the mounting flange 41 would be connected to a source of pressurized gas such as nitrogen for supplying such gas to the seal chamber 24.

The tubular insert 40 includes a tubular main body 42, which has a central passage 43 extending axially therethrough along the length of the fitting axis 44 (FIG. 2). Preferably, the passage 43 has a diameter which corresponds closely to the diameter of the outlet opening 37 so as to define a relatively smooth flow path for the supplied fluid.

The inner end of the main body 42 terminates at an annular flange or annulus 46, which flange 46 is configured to be slidably received within the socket 38 as will be described further herein relative to FIGS. 5-7.

Additionally, the sanitary fitting 35 includes an externally threaded connector nut 47 which is slidable along the main body 42 so that it may be slid downwardly into engagement with the corresponding threads of the housing socket 38. The nut 47 can rotate relative to the main body 42 which is typically maintained stationary within the socket 38 while the nut 47 is threaded into position. As described below, this locks the sanitary fitting 35 to the corresponding housing 16.

Figure 5:
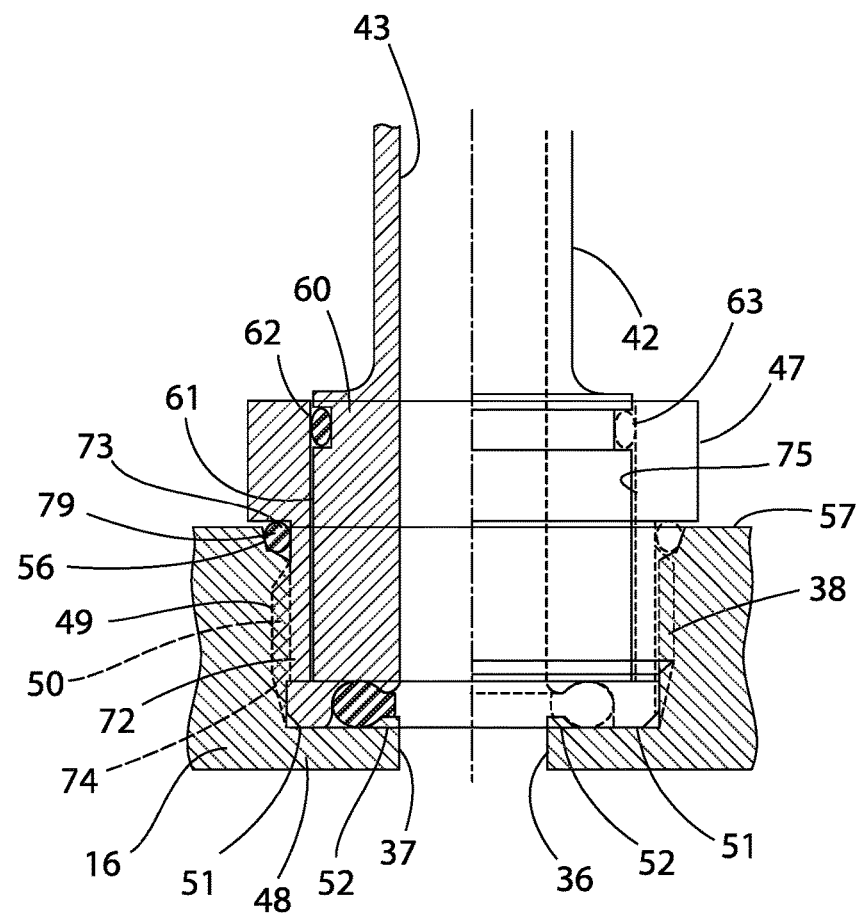
FIG. 5 is an enlarged view thereof.
Figure 6:
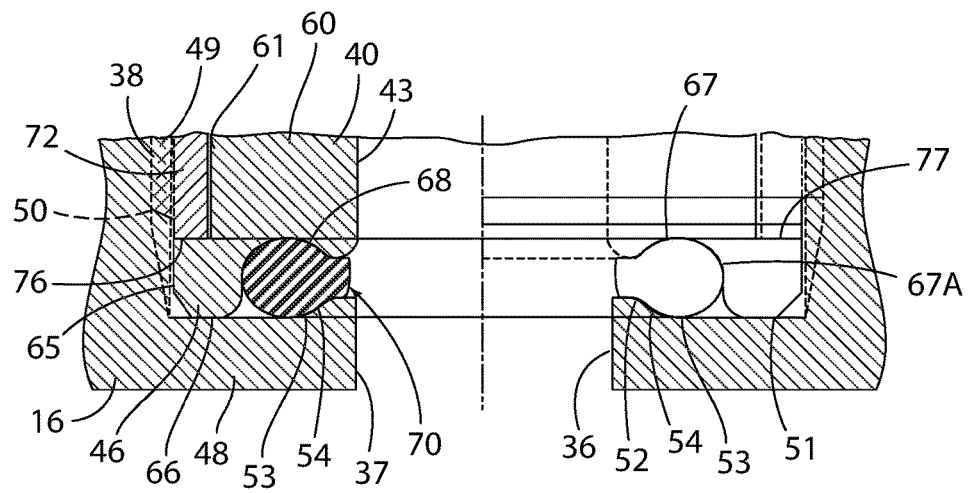
FIG. 6 is an enlarged partial view of a bottom of the sanitary fitting.
Figure 7:
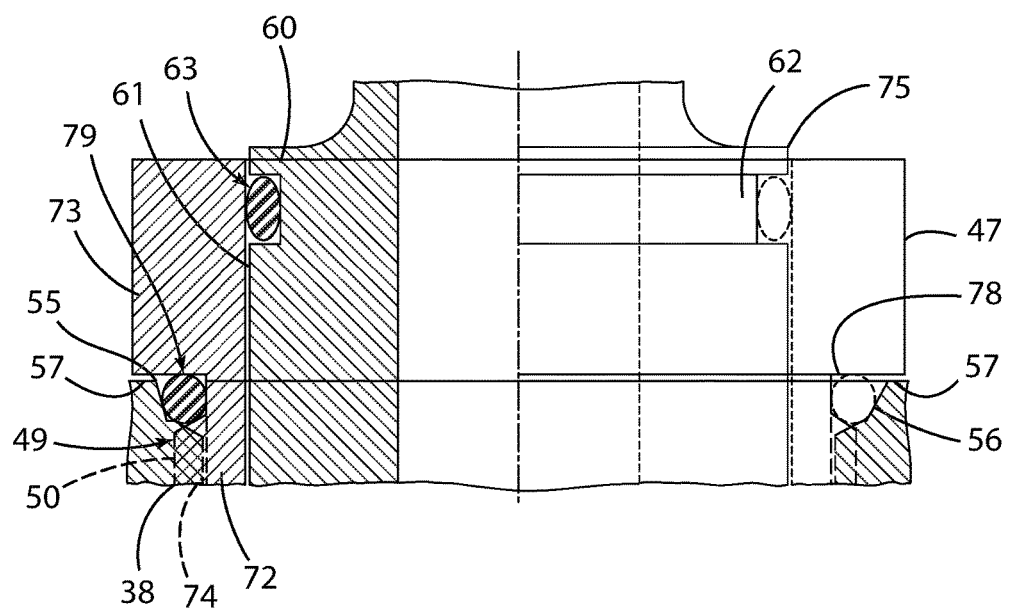
FIG. 7 is an enlarged partial view of a top of the sanitary fitting.

Turning next to FIGS. 5-7, the housing 16 is provided with the discharge port 36 which in turn is defined on an inner end by the inlet opening 37. This inlet 37 has a relatively short axial height relative to the total thickness of the housing 16. The opening 37 has a smooth annular surface which is smooth along its length and generally corresponds to the diameter of the tube passage 43. This inner section of the socket 38 is defined by a thin annular rim 48 which projects radially inwardly relative to a threaded socket section 49 disposed outwardly thereof.

The threaded socket section 49 has internal threads generally indicated in phantom outline by reference numeral 50 in FIGS. 5-7. The diameter of this threaded socket section 49 is greater than the diameter of the discharge opening 37 as seen in FIG. 6, so that the threaded socket section 49 is able to receive both the annular flange 46 and the threaded nut 47 of the sanitary fitting 35.

An interior surface of the rim 48 is formed with a flat bottom face 51 and a raised ridge 52. The ridge 52 rounds the discharge opening 37 and is formed with an annular gasket groove 53 which has an arcuate surface 54 located radially inwardly of the socket bottom face 51. The bottom face 51 faces towards the annular fitting flange 46 as seen in FIG. 6.

Referring to FIGS. 5 and 7, the outer threaded socket section 49 terminates at an opening 55 wherein an angled or chamfered corner 56 is formed near the junction between the socket section 50 and the outer housing surface 57.

Next, as to the tubular insert 40, the annular flange 46 is shaped to abut axially against the nut 47 which holds the insert 40 within the socket 48. More particularly, the outer mounting end of the fitting insert 40 comprises an enlarged thick-walled flange body 60 which has an axial length substantially greater than the annular flange 46 which projects radially outwardly therefrom. The flange body 60 is defined on an inner side by the passage surface 43 which extends along the main flange body 60 and opens axially into the socket opening 37. The flange body 60 in turn, is defined by an outer surface 61 which is circumferentially smooth and is formed with an annular gasket channel 62 that is provided with a gasket 63 therein. The gasket 63 is preferably formed as an O ring, although other suitable gasket constructions may be provided. As will be described, this gasket 63 is adapted to mate against the nut 47.

On the inner end of main body 60, the annular flange 46 is provided which projects radially outwardly of the outer surface 61 and terminates at an outer flange surface 65. This outer surface 65 has a diameter slightly smaller than the diameter of the threaded socket section 50 so that the annular flange 46 and the associated insert 40 can be slid axially into the socket 38 until the bottom flange face 66 abuts against the bottom socket surface 51 as seen in FIG. 6.

The bottom facing side of the annular flange 46 is provided with an annular gasket groove 67 which has a semi-circular surface 68 extending generally about two sides of the groove 67, but opens downwardly and radially inwardly into the fluid passage 43. This gasket groove 67 receives an annular O-ring 68 which normally has a circular cross section in a conventional manner, but is oversized relative to the groove 67 so that it projects downwardly beyond the bottom flange face 66.

More particularly, the gasket 68 has a typical O-ring configuration wherein it normally has a circular, cross-sectional shape. As mentioned, the gasket 68 protrudes downwardly beyond the bottom flange face 66 and contacts the bottom socket face 51 before the insert 40 is fully inserted into the socket 38. As the insert 40 continues to be inserted into the socket 38, the O-ring gasket 67 deforms, as seen in FIG. 6 due to the axial compression of the gasket 67 between the gasket surface 67A and the opposing socket face 51. Deformation of the O-ring gasket 67 is confined on the outward sides by the groove surface 67A and confined by the bottom socket face 51, but is open radially inwardly due to the formation of an axial space 70 formed between the insert 40 and the socket wall 48. The gasket 67 then widens in the radial direction and continues to project radially inwardly into space 70. As such, the gasket 67 axially compresses but radially widens which minimizes any crevice at the joint between the insert 40 and the socket 38. This prevents formation of any significant pocket between these components that could possibly retain fluid when the remainder of the system is drained.

In this manner, the insertion of the fitting insert 40 into the socket 38 causes formation of a seal by the gasket 67 which prevents migration of fluid within the passage 43 into the joint at such gasket 67. Hence, the insert 40 is sealed on the axial inner end thereof.

Referring to FIG. 7, the nut 47 is provided to removably fasten the insert 40 to the housing 16. In this regard, the nut 47 includes a cylindrical nose 72 and an outer drive section 73 which preferably is formed with a hex-head configuration to allow driving by conventional tools which allows rotation of the nut 47 into the socket 38. The nose 72 is externally threaded so as to include threads 74 which threadedly engage with the complimentary socket threads 50 as seen in FIG. 6. The driving section 73 and nose 72 define a smooth annular bore surface 75 which faces towards the opposing flange body 60 and the surface 61 thereof so that the above-described gasket 62 can seal the space between the surface 61 and bore surface 75 and prevent entry of contaminants into such space.

As the nut 47 is threaded into the socket 38, the bottom end face 76 (FIG. 6) abuts against an opposing outer flange face 77 of the annular flange 46 so that the nose 72 axially drives the annular flange 46 and associated insert 40 axially against the bottom socket surface 51. Rotational driving of the nut 47 axially drives the flange 46 and thereby retains the insert 40 within the socket 38. Since only the nut 47 is rotating and the insert 40 does not rotate during such engagement, the above-described gasket 67 is isolated from any rotational movements and only undergoes axial compression during this engagement step. This limits deformation of the gasket 67 to axial compression and radial widening and there is no circumferential deformation of the gasket 67.

Referring to FIGS. 5 and 7, the inner face or joint between the driving section 73 and threaded nose 72 includes an annular gasket channel 78 which receives a gasket 79 therein. This gasket 79 acts radially between the groove 78 and the chamfered corner 56 described above, so as to prevent entry of contaminants and other debris into the threads 50 and 74.

Since the nut 40 and tubular insert 40 are separate pieces, the main tubing section 42 can be bent at an angle if desired and held in a proper position while the rotatable nut 40 is tightened. This provides an additional advantage of the present invention.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A threaded sanitary fitting for an equipment housing, comprising:

a non-threaded tubular insert, which is insertable axially into a housing socket of an equipment housing, said insert having a main tubular body, which extends axially, is cylindrical and terminates at an end portion, said end portion including an annular flange which projects radially outwardly from said main tubular body so as to seat at a bottom of said housing socket when installed, said flange including a top flange face and a bottom flange face, which face axially away from each other in opposite upward and downward directions, a gasket groove provided in said bottom flange face, and a first gasket received in said groove provided in said bottom flange face, which said first gasket is positioned in said groove for axial contact with an opposing surface of said housing socket when installed, said gasket groove opening axially downwardly on an axially downward side of said bottom flange face to generate said axial contact between the bottom flange face and the opposing surface and radially inwardly on a radially inward side to allow any deformed portion of said first gasket to be squeezed radially inwardly through said radially inward side; and an externally-threaded nut which has an annular bore surface so that said nut is slidable downwardly over said insert along said main tubular body to abut axially against said top flange face of said flange, an exterior of said nut including a threaded nut surface engageable with an opposing threaded surface of a housing socket to drive said inert axially into the housing socket and retain said insert tightly therein to axially compress said first gasket, an inner face of said nut between a driving section and a threaded nose, which defines said threaded nut surface, including a second gasket, wherein said second gasket acts against said equipment housing to prevent entry of debris into said threaded nut surface; and a third gasket being provided between an interior surface of said nut and an outer tube surface of said main tubular body of said insert.

2. The sanitary fitting according to claim 1, wherein said flange includes said gasket groove, which opens outwardly and receives said first gasket in a position for compression and sealing contact between said flange and an opposing surface of said housing socket to prevent entry of fluids into this space.

3. The sanitary fitting according to claim 1, wherein said first gasket protrudes axially from said gasket groove for compression between said flange and an opposing surface of said housing socket when installed.

4. The sanitary fitting according to claim 3, wherein said flange has said bottom flange face which faces axially and defines said gasket groove which opens axially downwardly through said bottom flange face.

5. The sanitary fitting according to claim 1, wherein said nut includes an annular flange which faces outwardly and includes said second gasket facing outwardly for sealing contact with said equipment housing.

6. The sanitary fitting according to claim 5, wherein said outer tube surface of said insert includes a groove which opens toward said interior surface of said nut, wherein said groove includes said third gasket therein, which seals a space provided between said interior surface of said nut and said outer tube surface of said insert.

7. The sanitary fitting according to claim 1, wherein said gasket groove has a semi-circular groove surface extending about a radially outward side and axially upward side of said gasket groove, such that said gasket groove is open on said radially inward side and said axially downward side thereof.

8. The sanitary fitting according to claim 7, wherein said first gasket is an O-ring which fits against said semi-circular groove surface and protrudes axially downwardly and radially inwardly through said axially downward side and said radially inward side of said gasket groove.

* * * * *